United States Patent
Miyasaka et al.

[11] Patent Number: 6,070,162
[45] Date of Patent: *May 30, 2000

[54] INFORMATION SEARCH AND COLLECTION SYSTEM

[75] Inventors: Hitoshi Miyasaka; Shinji Miwa; Toshio Tanaka; Michihiro Nagaishi, all of Suwa, Japan

[73] Assignee: Seiko Epson Corporation, Tokyo, Japan

[*] Notice: This patent is subject to a terminal disclaimer.

[21] Appl. No.: 09/238,029

[22] Filed: Jan. 27, 1999

Related U.S. Application Data

[63] Continuation of application No. 08/982,366, Dec. 2, 1997, Pat. No. 5,907,838.

[30] Foreign Application Priority Data

Dec. 10, 1996 [JP] Japan .................................. 8-330077

[51] Int. Cl.[7] ................................................ G60F 17/30
[52] U.S. Cl. .................................. 707/4; 703/3; 703/103
[58] Field of Search ............................ 707/4, 3, 10, 103, 707/104; 395/200.43, 200.79, 200.73

[56] References Cited

U.S. PATENT DOCUMENTS

| | | | |
|---|---|---|---|
| 4,774,655 | 9/1988 | Kollin et al. | 364/200 |
| 4,972,349 | 11/1990 | Kleinberger | 707/1 |
| 5,224,205 | 6/1993 | Dinkin et al. | 364/200 |
| 5,437,027 | 7/1995 | Bannon et al. | 395/600 |
| 5,555,367 | 9/1996 | Premerlani et al. | 395/191 |
| 5,600,833 | 2/1997 | Senn et al. | 707/1 |
| 5,615,378 | 3/1997 | Nishino et al. | 704/4 |
| 5,634,053 | 5/1997 | Noble et al. | 707/4 |
| 5,694,580 | 12/1997 | Narita et al. | 395/500 |
| 5,727,158 | 3/1998 | Bouziane et al. | 395/200.55 |
| 5,754,676 | 5/1998 | Komiya et al. | 382/132 |
| 5,765,154 | 6/1998 | Horikiri et al. | 707/10 |
| 5,802,518 | 9/1998 | Karaev et al. | 707/9 |
| 5,826,269 | 10/1998 | Hussey | 707/10 |

OTHER PUBLICATIONS

Venkat N. Gudivada et al., Information Retrieval on the World Wide Web, IEEE Internet Computing, Sep.–Oct. 1997.

*Primary Examiner*—Jean R. Homere
*Attorney, Agent, or Firm*—Oliff & Berridge, PLC

[57] ABSTRACT

A method and apparatus wherein category classes which express information content categories are defined based on object-oriented programming. The information items that are to be collected for each category are set as properties, and an information acquisition method or information process and treatment method is described for each property. After a request input from a user has been converted into a request input format the system can understand, the request input is classified into category classes, searching is performed, and the information items the system outputs are displayed using the properties of the classes to which the request input belongs. Information searching and collection is accomplished on the basis of the contents described by said methods, and the information is output as comprehensive information in accordance with the request input of the user.

7 Claims, 7 Drawing Sheets

| CLASS | PROPERTY | METHOD |
|---|---|---|
| PERSON CLASS | FACE | CONSTRUCTOR SHOW |
| | PERSONAL HISTORY | CONSTRUCTOR SHOW |
| | OCCUPATION | CONSTRUCTOR SHOW |
| BUSINESS OWNER CLASS | ASSETS | CONSTRUCTOR SHOW |
| ENGINEER CLASS | ENGINEERING PAPERS | CONSTRUCTOR SHOW |

FIG.3

| CLASS | PROPERTY | METHOD |
|---|---|---|
| FACE CLASS | PHOTOGRAPH | CONSTRUCTOR SHOW |
| | INFORMATION SOURCE URL | CONSTRUCTOR SHOW |
| PERSONAL HISTORY CLASS | TEXT | CONSTRUCTOR SHOW |
| | LIST | CONSTRUCTOR SHOW |
| ENGINEERING PAPERS CLASS LIST | LIST | CONSTRUCTOR SHOW |

| CLASS | PROPERTY | METHOD |
|---|---|---|
| TEXT CLASS | FORMAT SIZE | CONSTRUCTOR COMPOSER SHOW |
| GRAPHICS CLASS | FILE FORMAT SIZE | CONSTRUCTOR COMPOSER SHOW |
| PHOTOGRAPH CLASS | FILE FORMAT SIZE | CONSTRUCTOR COMPOSER SHOW |

INFORMATION SEARCH AND COLLECTION SYSTEM

This is a Continuation of application Ser. No. 08/982,366 filed Dec. 2, 1997 now U.S. Pat. No. 5,907,838. The entire disclosure of the prior application is hereby incorporated by reference herein in its entirety.

BACKGROUND OF THE INVENTION

1. Field of Invention

The present invention relates to an information search and collection method and system which, when collecting certain specific information from the Internet, collects information corresponding to the request of a user from among a multitude of information relating to a keyword input by the user, and outputs this collected information as comprehensive information.

2. Description of Related Art

Recently, it has become possible to search for and collect all types of information using the Internet. When searching and collecting information over the Internet, there is for example a search method such that a keyword input by the user is entered into a search engine, and the addresses of all of the pages hit using that keyword are output.

For example, assuming information about a particular famous person is to be collected, the name of that person is input as the keyword, and the addresses of all pages hit using that keyword are output. Through this, the user obtains the desired information through an operation such as accessing pages identified by the search engine where the information needed by the user appears to exist, and extracting only the necessary information.

However, with the above-described search and collection method, when the person on which information is being collected is active in many fields, if a search is made using only the name as a keyword, the number of pages that are searched can at times be several hundred pages. Not only is this true for people, but can occur when obtaining information about a particular facility. For example, if the facility is famous there is a large possibility that information on that facility exists in various fields, and thus when search and collection are conducted using the facility name as the keyword, an enormous number of pages is searched.

As a method to improve even slightly the trouble of this search and collection process, it is possible, for example, to input a plurality of keywords expressing the information to be collected and to output the addresses of pages hit using all of the keywords, and to restrict the information to a certain degree such as by outputting only the addresses of pages where more than a set number of the keywords appear.

For example, when collecting various information relating to the main field of activity of a famous person active in a wide range of fields, the name of the person and the primary occupation are input as keywords, and only the addresses of pages hit using both keywords are output, so that the number of pages extracted is greatly restricted.

However, even when pages are extracted using a certain degree of restriction in this summer, there are many times when the information really required by the user is not all of the extracted pages, but only a portion thereof, and in effect it is necessary for the user to go through the effort of choosing and selecting the necessary information from among the extracted pages.

In this way, with the current level of research services, even when a certain degree of restriction of the information is accomplished, it is still ultimately necessary for the user to personally search for the necessary information from among the large quantity of identified information and compile a single information page. Accordingly, there is a need to improve the ease of use of such information search and collection methods and systems.

Hence, it is an objective of the present invention to analyze the input request from the user on the basis of keywords from the user, convert the request from the user into a format understandable by the system, perform searching and collecting of information on the basis of a predetermined algorithm, and provide comprehensive information in accordance with the request input from the user.

SUMMARY OF THE INVENTION

In a preferred information search and collection method of the present invention, a request input from the user is made into a request input format that the system can understand, information relating to the request input is collected on the basis of this request input format, the results of this collection are analyzed, the necessary content is extracted, and the extracted content is output as comprehensive information in accordance with the request input of the user.

In one aspect of the information search and collection method, category classes are defined which express content categories on the basis of object-oriented programming. Each category class has a corresponding set of information items that are to be collected for each category, and an information acquisition method or information process and treatment method is described for each property. After the request input from the user has been converted into a request input format the system can understand, the request input is classified into the category classes, the information relating to the information items that are to be collected are searched and collected for the request input based on the properties of the classes to which the request input belongs and based on the content described in the information acquisition, process and treatment methods. The collection results are output as comprehensive information in accordance with the request input of the user.

In addition, the method may be such that information items that are to be collected are defined as title classes. The title classes are such that for each information item, the content of the information of each information item is set as a property, and a data acquisition method and data processing and treatment method are defined for each of the contents of the information.

Furthermore, the method may be such that information items that are to be collected are defined as information format classes. The information format classes are such that for each information item, the method of displaying the information of each information content is set as a property, and a data acquisition method and a data processing and treatment method are defined for each of the ways of displaying the information.

In one aspect of the information search and collection method, the properties of categories are displayed so a user can select an arbitrary property from among the displayed properties.

In a preferred embodiment, the information search and collection system of the present invention includes: a request analyzing means for making the request input from the user into a request input format that the system can understand; an information collecting means for collecting information relating to the request input based on the request input format obtained by the request analyzing means; a content analyzing and collecting means for analyzing the collected results and extracting the necessary information content; and an information compiling and output means for compiling and outputting the content extracted by the content analyzing and collecting means as comprehensive information.

Furthermore, this system operates in one aspect of the invention so that category classes are defined which express content categories on the basis of object-oriented programming, and earn category class is set with the information items that are to be collected for each category as properties. An information acquisition method or information process and treatment method is described for each property, and after the request input from the user has been made into a request input format the system can understand, the request input is classified into the category classes. The information relating to the information items that are to be collected are searched and collected for the request input on the basis of the properties of the classes to which that request input belongs and on the basis of the content described in the information acquisition method, or information process and treatment method. The collection results are output as comprehensive information in accordance with the request input of the user.

In one aspect of the invention, the search and collection system has a class structure such that information items that are to be collected are defined as title classes, and for each information item the content of the information of each information item is set as a property. A method describing a data acquisition method and data processing and treatment method for each of the contents of the information is also defined.

In one aspect of the invention, a class structure is defined such that information items that are to be collected are defined as information format classes, and the information format classes are such that for each information item the manner of displaying the information of each information content is set as a property. A method describing a data acquisition method and a data processing and treatment method for each of the ways of displaying the information is also defined.

In one aspect of the invention, the information search and collection system displays the properties of the categories and it is possible for a user to select an arbitrary property from among those displayed properties.

As described above, the present invention converts the request input from the user into a request input format understandable by the system, classifies that request input into categories, and with respect to that request input searches for and collects information on the basis of the properties of the classes to which that request input belongs and on the basis of the content described in the methods for each of the properties. The collected results are output as comprehensive information in accordance with the request input from the user. Through this, on the system side it is possible to accomplish searching and collecting of information desired by the user by following a predetermined algorithm on the basis of the keywords input by the user, so that highly efficient information searching and collecting is possible. In addition, the collected information can be extracted as a single packet of information in accordance with the request input from the user.

In addition, information items are defined as title classes, the information content is set as a property for each of the various title classes, and by determining the method thereof, it becomes unnecessary to set, for each category into which the keyword from the user is classified, the method indicating the manner of information searching and the manner of information processing for each of said information items, and it becomes possible to simplify the algorithm, so that the efficiency of the process is improved.

Furthermore, the display method for the information is set as a property for each of the contents of the information, and there are methods describing the data acquisition method and data processing and treatment method for each way of displaying the various information. Consequently, when the information is information having the same format in differing classes, it is possible to process this using a common algorithm, thereby boosting the efficiency of the process.

In addition, the properties of each category are displayed to the user and the user can select arbitrary properties from among the displayed properties. Consequently, it is possible to realize user customization and to search and collect only information in accordance with the desires of the user, thereby boosting the efficiency of the process.

BRIEF DESCRIPTION OF THE DRAWINGS

FIG. 3 is a drawing describing one example of the methods and properties in the category class structure shown in FIG. 2.

DETAILED DESCRIPTION OF PREFERRED EMBODIMENTS

Hereafter, the configuration of the embodiment of the present invention will be described with reference to the drawings.

Figure 1:
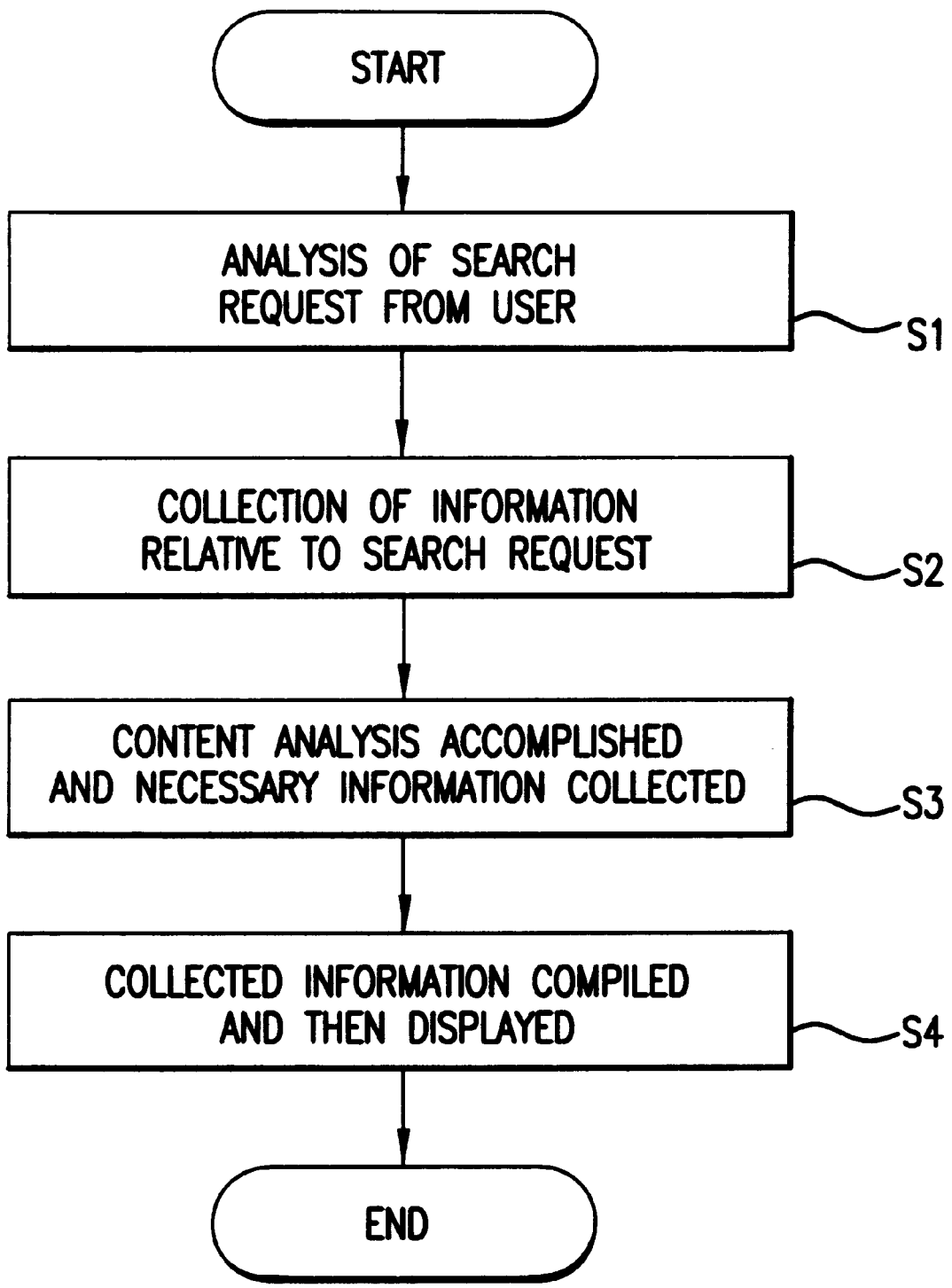
FIG. 1 is a flowchart describing the information search and collection process sequence of the present invention.

As shown in FIG. 1, when a search request from the user is received, analysis of that search request is accomplished (step S1), and this request is converted into a format the information search and collection system can understand. Then, the converted search request is input into a search engine and a search for information relating to that search request is performed (step S2). The content of the search results is analyzed and the necessary information is collected (step S3). Then, the collected information is compiled and displayed to the user (step S4).

The above flow of processes is a schematic process accomplished by the present invention, and the various steps of the processes will now be described in more detail.

For example, the case where the user collects information about a world famous person (this person will be called "A") will be described. Assuming this person A is world famous, whether an engineer or a business owner or in some other field, the user will collect information on person A as an engineer and a business owner based on a pre-defined category class structure.

It will be assumed that a photograph of person A, a personal history, engineering papers and assets as a business owner, for example, constitute the information on person A as an engineer and business owner required by the user.

When the user attempts to obtain the information about person A as an engineer and a business owner, various methods can be used as an information request input method, and one of these methods is for example to input the name "A" of person A using a keyboard. At this stage, the system side analyzes that input, and understands that the request of the user is a search request for some kind of information about "a person by the name of A". Next, the user inputs the kind of information the user is trying to collect about this person A. Here, because the user is trying to collect information about the person called "A" as an engineer and business owner, the user inputs contents such as engineer and business owner.

In response, the system converts the request from the user into an input format based on a predefined category class structure, e.g., the request is converted to a form person, engineer and business owner, name of "A".

Figure 2:
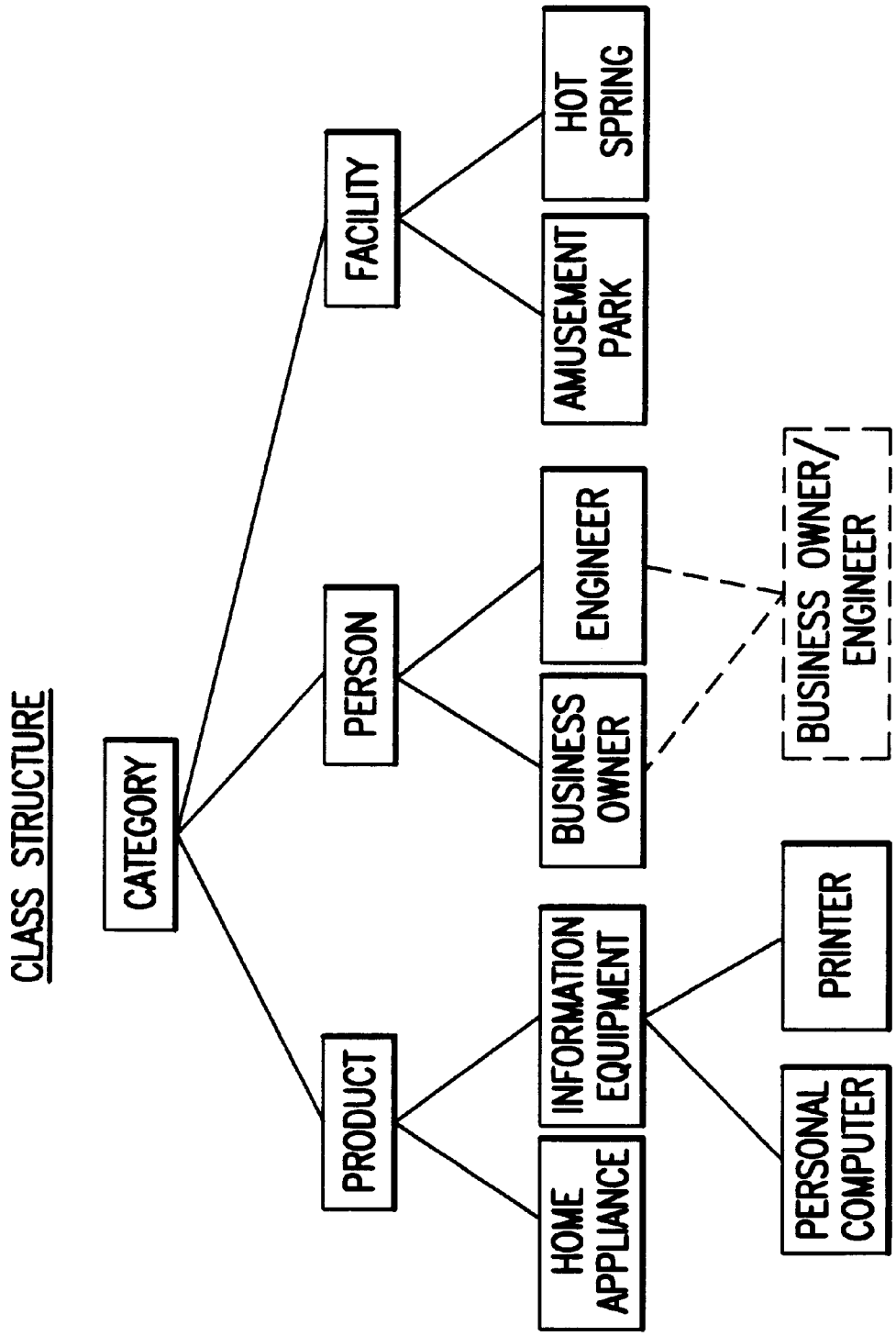
FIG. 2 is a drawing showing the class structure of a category class corresponding to the request input of the user in the information search and collection process of the present invention.

That is, the present invention has a class structure (called class structure 1) that uses object-oriented programming. As shown in FIG. 2, there are category classes such as, for example, facility, person and product. Subclasses of the category classes are also shown. For example, the class "person", includes subclasses such as engineer and business owner. Additional subclasses not represented in the drawing can be added, such as, athlete, politician and the like.

In this kind of class structure, "A" is a business owner/engineer who is categorized into the engineer class and the business owner class, which are subclasses of the person class.

There are also cases where the request input from the user is an example of one class of the category classes, but as in the above-described example, there are also cases of request input examples that are categorized into a plurality of category classes.

Furthermore, if any of the classes in a category is identified during search request analysis, the items of information to be searched are determined for each of the classes. For example, as shown in FIG. 3, if the class identified is the person class, then the face, personal history and occupation and the like are set as properties. If the subclass is the business owner class, assets is set as the property. If the subclass is the engineer class, engineering papers is set as the property. In this way, the items of information to be searched for are set beforehand as properties for each of the classes.

Furthermore, the method of collecting that information (constructor) and the method of displaying information (show) to the user are described beforehand as methods for each of the properties.

For example, for "face" which is a property of the person class, the method of collecting information is described for each of the items so that images having a face image file and a title including the name of that person are extracted from the information collected when the name "A" is input into the search engine as a keyword.

In this way, with this configuration of the embodiment, the keywords input by the user, such as the name of the person and business owner/engineer, are converted into an input format based on the predefined category structure. Information is collected based on the method of collecting information for each property (face and personal history for the person class, assets for the business owner class and engineering papers for the engineer class, etc.) for each of the identified category classes, and the information that is collected is output to the user as comprehensive information.

In other words, in the above example, the photographs, personal history, engineering papers, assets and the like for the person called "A" are displayed to the user with the information of person A as a business owner/engineer compiled on one page.

The class structure 1 shown in FIG. 2 is one example of a class structure that sets the respective classes or subclasses of a category as the substance of the collected information content, and an example was described wherein the information collection items for each of the category classes and the subclasses thereof are set as properties and the information collection method and information processing and treatment method are described for each of the respective properties. However, it is also possible to set the collection items for title classes as the properties and to determine methods for each of those properties.

In other words, the properties in class structure 1 (for example, face, personal history, assets, engineering papers, and the like) become the titles of the respective items when the page to be displayed to the user is created, and using these as the title classes, the properties for the title classes are determined beforehand, and the method of collecting information (constructor) and the manner of displaying information (show) to the user are described beforehand as methods for each of these properties.

Figures 4, 5:
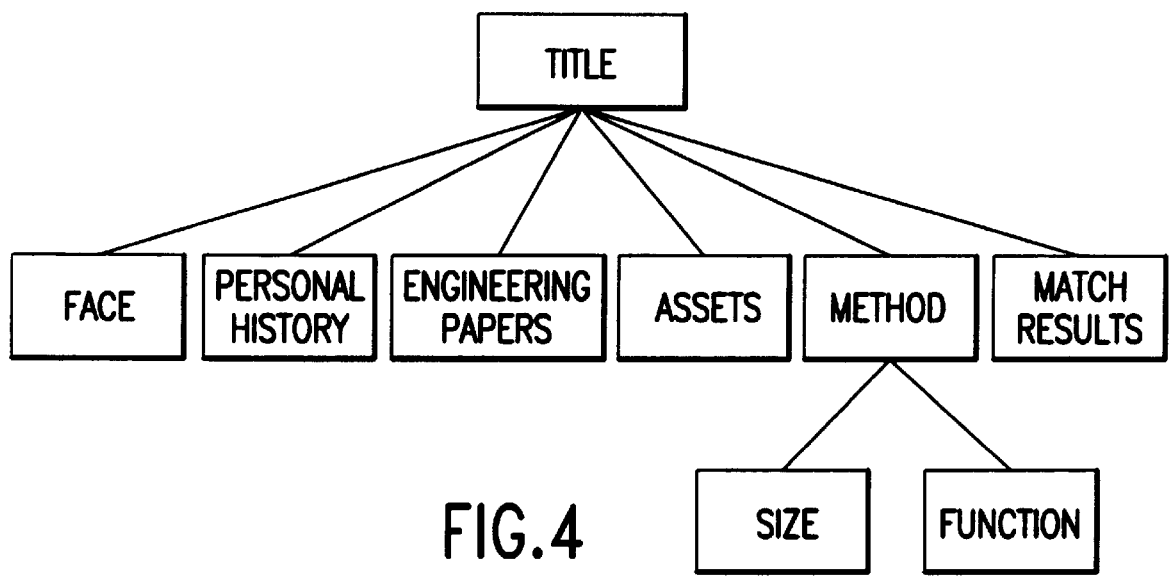
FIG. 4 is drawing showing the class structure wherein the properties in the category classes shown in FIG. 3 are made into title classes.
FIG. 5 is a drawing describing one example of the methods and properties in the title class structure shown in FIG. 4.

In the example of the class structure (called class structure 2) shown in FIG. 4, the face class, personal history class, engineering papers class, asset class and the like are set as title classes. For each of these title classes, for example for the face class, a photograph and the information source URL indicating from where on the Internet the photograph was extracted are set as properties of the content of the information of that face class, as shown in FIG. 5. In addition, for the personal history class, the text and list properties are set as the content of the information, and for the engineering papers class, list is set as the property of the content of the information. The method of collecting information (constructor) and the method of displaying information (show) to the user are predefined as methods for each of the properties.

In this way, properties which indicate the contents of the information for each title class are set for each of the title classes, and for these respective properties, the method of collecting information (constructor) and the method of displaying information to the user (show) are determined.

By employing this kind of method, when properties exist which are in common among differing category classes, it is not necessary to describe the method such as the method of collecting information about each of the titles for each of the category classes.

Furthermore, it is also possible to define an information format class for the properties indicating the manner of displaying information for each of the contents of the information such as photograph, text, list and the like indicated by the above-described class structure 2.

Figures 6, 7:
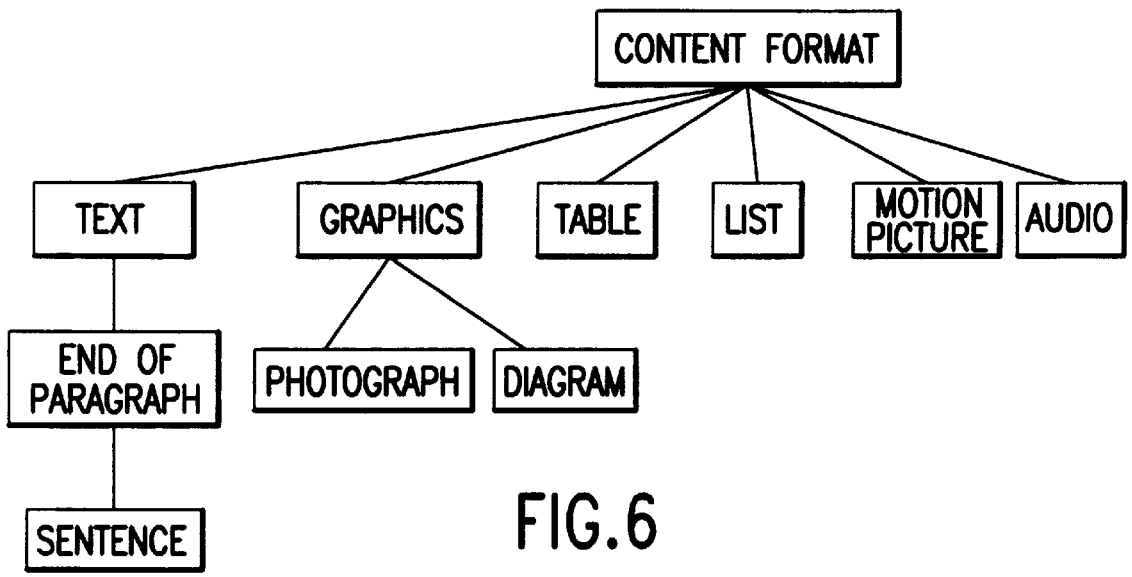
FIG. 6 is drawing showing the class structure wherein the properties in the title classes shown in FIG. 4 are made into information format classes.
FIG. 7 is a drawing describing one example of the methods and properties in the information format class structure shown in FIG. 6.

For example, concerning the content of the information of each item expressing the title, a class structure (called class structure 3) is set which expresses each information format such as text, graphics, table, list, motion picture, audio and the like, as shown in FIG. 6. Then, as shown in FIG. 7, in the case of the text class, for example, format and size and the like are set as properties, and the information acquisition method and the information processing and treatment method are described in the method. In this method, in the case of text a description is made relating to either how to collect the text and how to set the format and size, or how to summarize the contents.

By thus expressing the information contents of the item expressing the title as an information format class using a class structure, it is possible to make the information collection process common when information having the same format is extracted in differing categories.

For example, when the category class is the person class, text information relating to that person might exist in the information to be collected in that person class, and in addition, even when the category class is the facility class, there might be text information expressing an overview of the facilities. Thus, even with differing category classes, there are many cases where the information formats (information contents) that express the substance of the information items corresponding to the respective category classes are the same. Accordingly, by making the method of collecting and processing information relating to a format expressing the substance of the information items common, it is possible to further boost the efficiency of information collection.

The above-described configuration of the embodiment is the information search and collection process in the case where the user is trying to collect information for a person "A" as a business owner/engineer, and "A" is the name of person "A" and keywords such as "business owner/engineer" are input into the system side as keywords.

Thus, when the user inputs specific keywords, the search request is changed based on the keywords to a request input format understandable by the system side. In this case, the "A" and "business owner/engineer" input by the user are analyzed and are converted into a format that the system can understand, such as a format like "a certain person, that person is a business owner and engineer, and the name thereof is A", in other words, "person, business owner/engineer, A".

Figure 8:
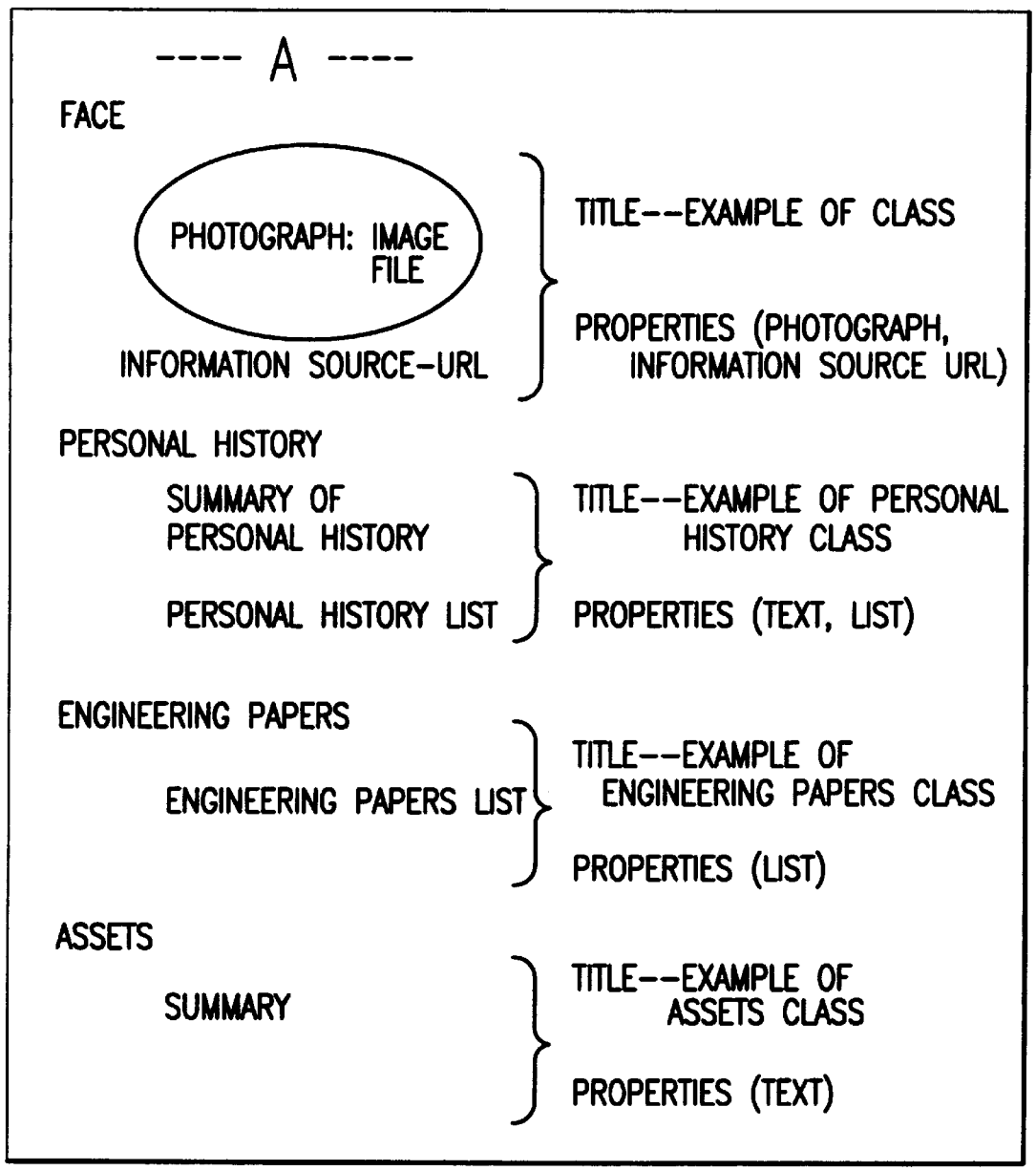
FIG. 8 is drawing describing one example of the format of information output by the information search and collection process of the present invention.

Then, information collection is accomplished using a predetermined method for the preset properties (person class: face, personal history, occupation and the like; business owner class: assets and the like; engineer class: engineering papers and the like) for the respective categories (person class, business owner class, engineer class), and the collected information is displayed in a designated format in accordance with the request from the user. FIG. 8 shows an example of the display of information collected in this manner. In this case, it is possible to collect information by making the properties (in this case, face, personal history, engineering papers and assets) of the category classes that are also the titles of each item in this display page to be like the example in FIG. 5 on the basis of the class structure 2 shown in FIG. 4. Furthermore, it is possible collect information as in the example in FIG. 7 on the basis of the class structure 3 of FIG. 6 for each of the respective formats (text class, graphics class, photograph class, and the like) of the respective title classes.

In the example in FIG. 8, the facial photograph of person "A" and the information source URL thereof are displayed, a summary of the personal history and a personal history list are displayed as the personal history, an engineering papers list is displayed as the engineering papers and a summary is displayed of the assets. Thus, only the information in accordance with the request from the user is extracted from among the numerous information items searched on the basis of the keywords input by the user, and these items are output as a single compiled comprehensive information packet.

In the above-described embodiment, an example was described wherein the user inputs a request using a keyboard, but this is intended to be illustrative and not limiting. The user could use an interactive system to input search requests, for example. Hereafter, an interactive system will be described schematically.

First, the user makes an input such as "I want to know about a person named A". Through this, input analysis is performed on the system side based on the input from the user, and at this stage the analysis results are of the form "person, -?-, A". A display such as "Do you know anything about A?" or "What kind of things would you like to know?" is made from the system side.

In response, the user makes an entry such as "A is considered a visionary in the information industry". The system then converts the request from the user to a format such as "person, business owner/engineer, A" and accomplishes the search process on this basis. In addition, this interactive method need not be an interactive method using a keyboard and screen display, but can be an interactive method using natural language.

In addition, the system could display to the user the properties of the category class of the keyword that was input, and the user could select a property from the displayed properties. Furthermore, the system could display the class structure, such as that shown in FIG. 2, on the screen of the system, and the user could click on and select the required category class from among these category classes. Furthermore the system could display the properties of the selected category class and the user could select from among the displayed properties.

In this manner, the user selects the required properties and selects the class, and the process is accomplished on the basis of this, and the process may be conducted for only the necessary search items so that the efficiency of the process is boosted and rapid data search and collection processes become possible.

Figure 9:
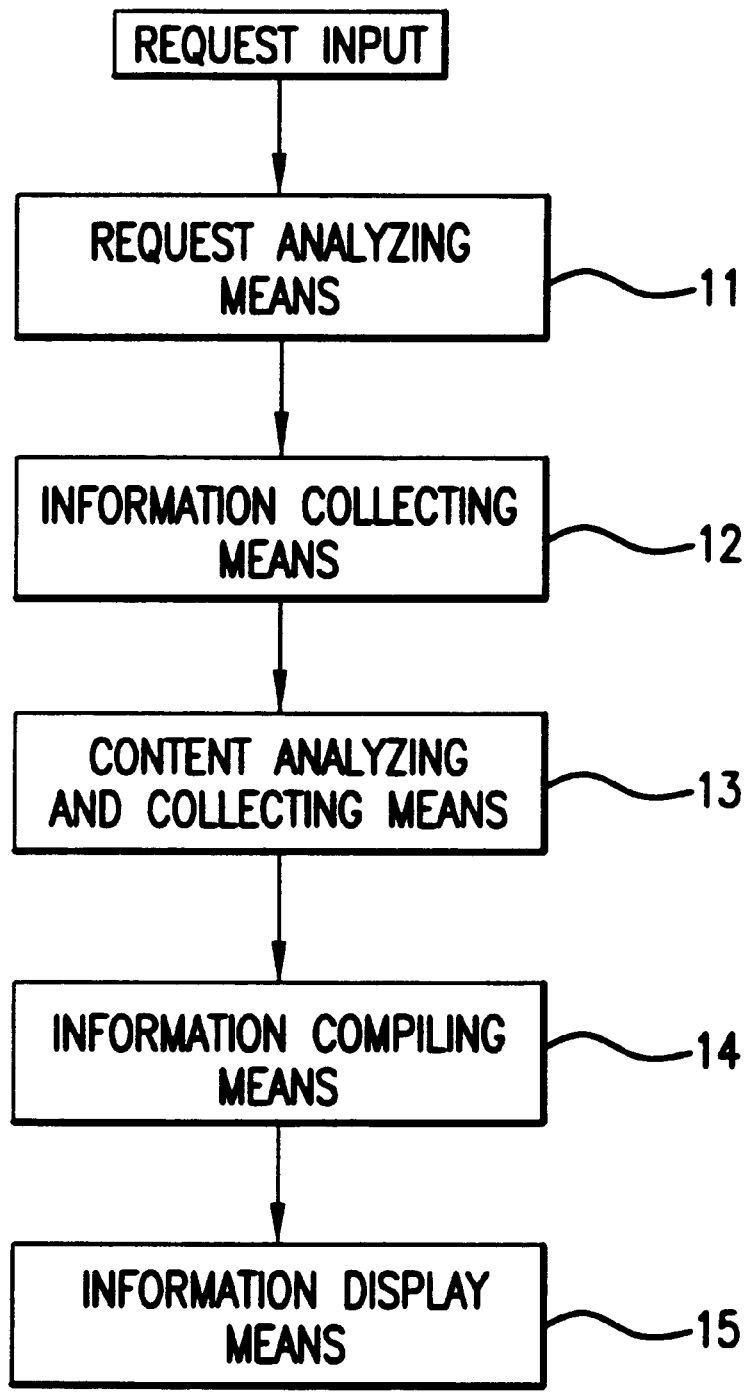
FIG. 9 is a schematic system configuration drawing of the present invention.

FIG. 9 shows the schematic structure of the system of the present invention, and this structure primarily consists of a request analyzing means 11, an information collecting means 12, a content analyzing and collecting means 13, an information compiling means 14 and an information display means 15.

The request analyzing means 11 converts the keywords input by the user into a format the system can understand. That is to say, this means converts the input into a format such as "person, business owner/engineer, A" on the basis of the contents input by the user, as described above.

Related information is collected on the Internet by the information collecting means 12 on the basis of this kind of request format, and the required information is collected from among this collected information by the content analyzing and collecting means 13. The method of collecting this information is, in the case of the person class, collecting the face, personal history and occupation as properties thereof on the basis of the method determined for each respective property.

Then, the various information that was collected is compiled in a predetermined format by the information compiling means 14, and an information display is accomplished by the information display means 15. This compiling work need not be simply compiling in the predetermined format, but for example, this work may include summarizing with text data, depending on the case, and compressing and reducing data with graphics data. Following this kind of compiling work, the information is output as the information of a page in the kind of format shown in FIG. 8.

The present invention can be realized not only on servers, but also with client software. In this case, for example the category classes described above are held as client software, and part of the process is accomplished by the client software, such as the user inputting keywords on the basis of the class structure of the category classes, and the ultimate results being extracted from the server. It is possible to divide the process up between the client software and the server so that the portion with a large number of processes is accomplished by the server, or it is also possible to accomplish all of the processes using the client software.

The process program for accomplishing the processes of the present invention can be stored on a memory medium such as a floppy disk, an optical disk or a hard disk or the like. The present invention includes these kinds of memory media, and in addition data can be obtained from a network.

The present invention converts the request input from the user into a request input format understandable by the system, classifies that request input into categories, and with respect to request input, searches for and collects information based on the properties of the classes to which that request input belongs and based on the content described in the methods for each of the properties. Then, the system outputs the collected results as comprehensive information in accordance with the request input from the user. Through this, on the system side it is possible to accomplish searching and collecting of information desired by the user by following a predetermined algorithm on the basis of the keywords input by the user, so that highly efficient information searching and collecting is possible. In addition, the collected information can be extracted as a single packet of information in accordance with the request input from the user. For example, if the information collection is one for a person, items such as the personal history of that person or the contents of work are set as titles, and it is possible to provide information in a state with the various information compiled by title.

In addition, title classes are defined for each item of information the system outputs with respect to the request input from the user. The respective title classes are such that the contents of the information for the respective items are set as properties for each respective item, and there is a method that describes the data acquisition method and the processing and treatment method for each respective information content. In this way, the information content is set as a property for each of the title classes, and by determining the method thereof, it becomes unnecessary to set, for each category into which the keyword from the user is classified, the method indicating the method of information searching and the method of information processing for each of said information items. In addition, it becomes possible to simplify the algorithm, so that the efficiency of the process is improved.

Furthermore, information format classes indicating the manner of displaying the information are defined for each of the contents of the above-described information. The respective information format classes are such that the display method for the information is set as a property for each of the contents of the information, and there are methods describing the data acquisition method and data processing and treatment method for each way of displaying the various information. Through this, when the information is information having the same format in differing classes, it is possible to process this using a common algorithm, thereby boosting the efficiency of the process.

In addition, the properties of each category are displayed to the user and the user can select arbitrary properties from among the displayed properties. Consequently, it is possible to realize user customization and to search and collect only information in accordance with the desires of the user, thereby boosting the efficiency of the process. In the case of a fee-based search service, it is possible to receive the service for an inexpensive price.

With the present invention as described above, when information is searched for and collected on the Internet on the basis of a request input from the user, it is not necessary for the user to restrict the information from the enormous number of search results, as was the case conventionally, but it is possible to extract efficiently information the user needs as a single compiled information packet for each item following a predetermined algorithm.

What is claimed is:

1. An information search and collection system, comprising:

a request analyzer that converts a request input from a user into a request input format that the system can understand;

an information collector that collects information relating to said request input on the basis of the request input format obtained by the request analyzer;

a content analyzer that analyzes collected information and extracts a necessary content based on the analyzed request input; and, an information compiler that compiles and outputs a content extracted by the content analyzer as comprehensive information in accordance with the request input of the user.

2. An information search and collection system for searching and collecting information on the basis of request inputs from a user, comprising:

a request analyzer that converts the request input from the user into a request input format that the system can understand;

an information collector that collects information relating to said request input on the basis of the request input format obtained by the request analyzer;

a content analyzer that analyzes collected results and extracts a necessary content; and an information compiler that compiles and outputs a content extracted by the content analyzer as comprehensive information in accordance with the request input of the user;

wherein category classes are defined which express content categories based on object-oriented programming, each category class is set with information items that are to be collected for each category as properties, and an information acquisition method or information process and treatment method is described for each property, and wherein after the request input from the user has been made into a request input format the system can understand, the request input is classified into said category classes, the information relating to said information items that are to be collected are searched and collected for the request input based on the properties of the classes to which that request input belongs and based on the corresponding acquisition method or information process and treatment method, and collection results are output as comprehensive information in accordance with the request input of the user.

3. The information search and collection system of claim 2, wherein information items that are to be collected are defined as title classes, and the title classes are such that for each information item, a content of the information of each information item is set as a property, and a method describing a data acquisition method and data processing and treatment method for each of the contents of the information is defined.

4. The information search and collection system of claim 3, wherein information items that are to be collected are defined as information format classes, and these information format classes are such that for each information item, a method of displaying the information of each information content is set as a property, and wherein a method describing a data acquisition method and a data processing and treatment method for each way of displaying the information is defined.

5. The information search and collection system of claim 2, wherein the properties of said categories are displayed and an arbitrary property is selected from among those displayed properties.

6. The information search and collection system of claim 1, wherein the information collector includes a predetermined algorithm using keywords input by the user.

7. The information search and collection system of claim 1, wherein the information collector yields information extracted as a single packet of information in accordance with the request input of the user.

* * * * *